(12) United States Patent  (10) Patent No.: US 6,517,041 B2
Raum  (45) Date of Patent: Feb. 11, 2003

(54) DISPLACEMENT ARRANGEMENT

(75) Inventor: Holger Raum, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 09/908,398

(22) Filed: Jul. 18, 2001

(65) Prior Publication Data

US 2002/0017597 A1 Feb. 14, 2002

(30) Foreign Application Priority Data

Aug. 12, 2000 (DE) .......................... 100 39 501

(51) Int. Cl.$^7$ .............................................. F16M 13/00
(52) U.S. Cl. ................. 248/424; 248/222.12; 248/408
(58) Field of Search .......................... 297/353, 411.36; 248/222.12, 223.41, 224.61, 408, 409, 424, 429

(56) References Cited

U.S. PATENT DOCUMENTS

| | | | | |
|---|---|---|---|---|
| 4,012,158 A | * | 3/1977 | Harper | 248/408 |
| 4,036,525 A | * | 7/1977 | Howk | 248/408 |
| 4,451,084 A | * | 5/1984 | Seeley | 248/297.31 |
| 4,639,039 A | * | 1/1987 | Donovan | 248/297.31 |
| 4,930,840 A | * | 6/1990 | Tornero | 297/353 |
| 5,324,096 A | * | 6/1994 | Schultz | 297/353 |
| 5,664,842 A | * | 9/1997 | Tseng | 297/353 |
| 5,685,609 A | * | 11/1997 | Miotto | 297/353 |
| 5,695,249 A | * | 12/1997 | Lotfi | 297/353 |
| 5,918,938 A | * | 7/1999 | Miotto | 248/297.31 |
| 6,062,646 A | * | 5/2000 | Bock | 248/118.3 |
| 6,276,757 B1 | * | 8/2001 | Brown | 297/353 |
| 6,371,424 B1 | * | 4/2002 | Shaw | 248/187.1 |

* cited by examiner

Primary Examiner—Korie Chan
(74) Attorney, Agent, or Firm—Elliot M. Olstein; Raymond J. Lillie

(57) ABSTRACT

In an arrangement for displacement of a displacement member along a stationary base by means of a reciprocatable elongate actuating member, the displacement member has at least one linear tooth arrangement. Two axially spaced ratchet members are pivotably mounted on the actuating member at at least one longitudinal edge thereof. The ratchet members diverge away from each other and have ratchet teeth which are operable to engage with the linear tooth arrangement. The ratchet members are urged towards the linear tooth arrangement by springs. Operatively disposed between the at least one linear tooth arrangement and the actuating member, for disengagement of the corresponding ratchet member out of the linear tooth arrangement, is a disengagement member determining the linear stepping advance movement performed by the displacement member.

9 Claims, 3 Drawing Sheets

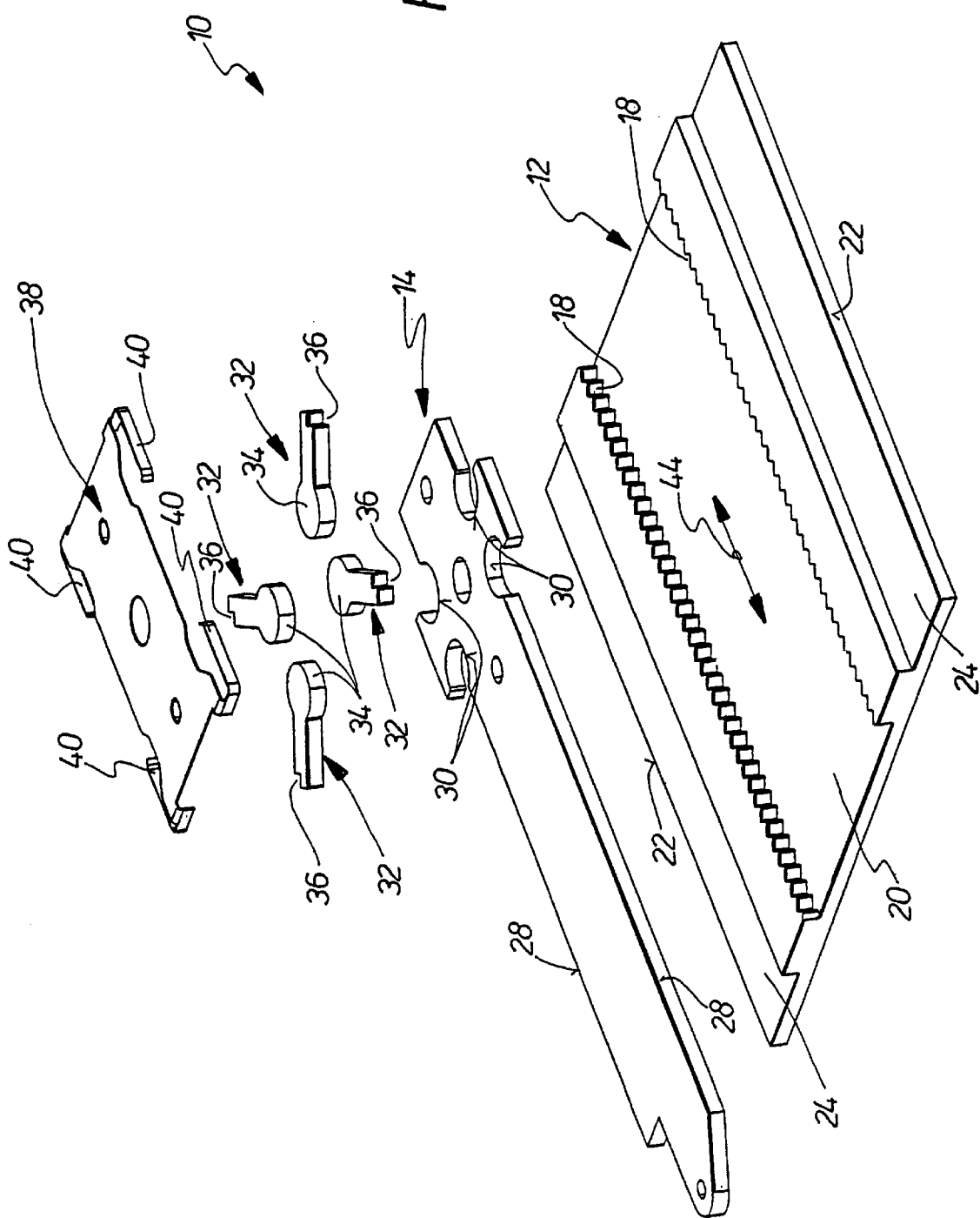

DISPLACEMENT ARRANGEMENT

FIELD OF THE INVENTION

The invention concerns an arrangement for displacing a displacement member along a stationary base.

A typical use of such an arrangement for displacing a displacement member along a stationary base is for example in relation to vehicle seats for adjusting the seat squab of the vehicle seat to a desired position in relation to a support base structure.

BACKGROUND OF THE INVENTION

A form of arrangement for displacing a displacement member, for example in the case of a vehicle seat for displacement of the squab in relation to a support base structure, includes an elongate actuating member which engages with the displacement member to produce a sliding movement thereof. In such an arrangement the elongate actuating member may be formed by a screw spindle and the displacement member may be formed by a nut member, the screw spindle and the nut member being dimensioned to afford a self-locking effect so that after displacement of the arrangement, by rotation of the screw spindle in a respective direction of rotation, the arrangement is automatically prevented from moving out of its set position when that is not wanted, by virtue of the screw spindle rotating in the opposite direction. The screw spindle is screwed through the nut member and that requires a suitable degree of precision in terms of the cooperation thereof. In addition, displacement of the displacement member in relation to the stationary base can be relatively time-consuming, depending on the respective screwthread pitch of the screw spindle and the nut member.

SUMMARY OF THE INVENTION

An object of the present invention is to provide an arrangement for displacing a displacement member along a stationary base, which is of a simple structure while affording reliability of operation and which is of a small structural height for enhanced ease of installation.

Another object of the present invention is to provide an arrangement for displacing a displacement member along a stationary base which is simple to actuate and which makes it possible to achieve long displacement travel movements without involving a great deal of time to produce same.

Still another object of the present invention is to provide an arrangement for displacing a displacement member along a stationary base, by means of a simple actuating movement and also affording a self-locking action.

In accordance with the principles of the present invention the foregoing and other objects are attained by an arrangement for displacing a displacement member along a stationary base, by means of an elongate actuating member. The displacement member has at least one linear tooth means, wherein first and second axially mutually spaced ratchet members are pivotably mounted on the actuating member at at least one longitudinal edge thereof, the ratchet members including with each other an opening angle and being provided with ratchet tooth means adapted to the linear tooth means on the displacement member. The ratchet members are urged towards the linear tooth means by means of spring members. Between the at least one linear tooth means on the displacement member and the actuating member is a disengagement member for the respective ratchet member, the disengagement member being fixed with respect to the base and determining the respective linear displacement advance movement step in one direction of displacement or the other opposite direction of displacement. Frictional conditions between the displacement member and the stationary base are such that the actuating member entrains the displacement member in a stepwise movement in a ratcheting mode in the respective one direction of displacement or the other opposite direction, but in the direction opposite to the respective direction of displacement the displacement member is secured to the base by frictional engagement and only the actuating member is moved back in ratcheting mode in relation to the displacement member by the displacement advance movement step.

In a preferred feature of the invention the elongate actuating member is in the form of an elongate plate or bar member. It may involve a stamped sheet metal member.

In a further preferred feature of the invention, affording a displacement arrangement of a very simple structure without requiring the use of mounting pins or journals, the elongate actuating member, at at least one longitudinal edge thereof, is provided with first and second round recesses disposed at a spacing from each other in the elongate direction of the actuating member, wherein a respective ratchet member has a round mounting portion which is pivotably movably mounted in a respective one of the recesses in the actuating member. Such an arrangement not only has the advantage that mounting journals are not required for supporting the ratchet members, but the assembly complication is very low because the ratchet members, with their round mounting portions, are pivotably mounted in a virtually floating condition in the recesses in the elongate actuating member.

A preferred configuration of the displacement arrangement according to the invention provides that first and second spring members are mounted at at least one longitudinal edge of the actuating member, for urging the operatively associated ratchet members towards the position of engagement with the linear tooth means on the displacement member.

In a further preferred feature of the invention the at least one linear tooth means, the elongate actuating member and the at least one pair of ratchet members are of thickness dimensions which at least approximately correspond to each other. Such a design configuration results in the arrangement according to the invention being of a very small overall thickness so that the amount of space required for the arrangement for example in relation to a vehicle seat is advantageously small.

A further preferred feature of the invention provides that the spring members are in the form of leaf springs which are of a thickness dimension adapted to the ratchet members and the actuating member.

In a preferred feature the ratchet members are secured to the actuating member by means of a cover plate member fixed to the actuating member, the cover plate member being of small wall thickness, with the spring members projecting from the cover plate member as integral components thereof. Such a cover plate member with integrally projecting spring members can be easily produced from a portion of spring plate of small wall thickness by suitable stamping and bending operations. The assembly complication and expenditure for combining the spring members with the ratchet members is also advantageously low in this case.

In a further preferred feature of the invention the at least one disengagement member for the ratchet members is provided on a central lengthwise portion of the base, thereby affording a double-acting linear ratchet displacement arrangement, in other words, a displacement arrangement in which the displacement member is linearly displaceable in a stepwise ratcheting mode by means of the actuating member in one direction or in the other opposite direction.

From the points of view of uniform loading or stressing of the arrangement and wear of the arrangement according to the invention, it is preferable if the displacement member has first and second linear tooth means which are disposed at a spacing from each other and which are oriented in parallel relationship and between which the elongate actuating member is disposed at equal spacings from the first and second linear guide means. A respective pair of ratchet members is pivotably mounted to the actuating member at each of the two longitudinal edges thereof, the ratchet tooth means of the ratchet members being urged towards the correspondingly associated linear tooth means by means of respectively associated spring members. A respective disengagement member which is fixed with respect to the base is operatively disposed between each linear tooth means and the associated longitudinal edge of the actuating member.

Further objects, features and advantages of the invention will be apparent from the description hereinafter of a preferred embodiment.

BRIEF DESCRIPTION OF THE DRAWING

FIG. 5 shows an exploded perspective view of the displacement arrangement but without illustrating the stationary base or the disengagement members associated therewith.

DESCRIPTION OF THE PREFERRED EMBODIMENT

It will be noted at this point that the same components and features are identified in each of FIGS. 1 through 5 by the same respective reference so that there will be no need for all such components and features to be fully described in detail in relation to each of the Figures, for the avoidance of unnecessary repetition.

Figure 1:
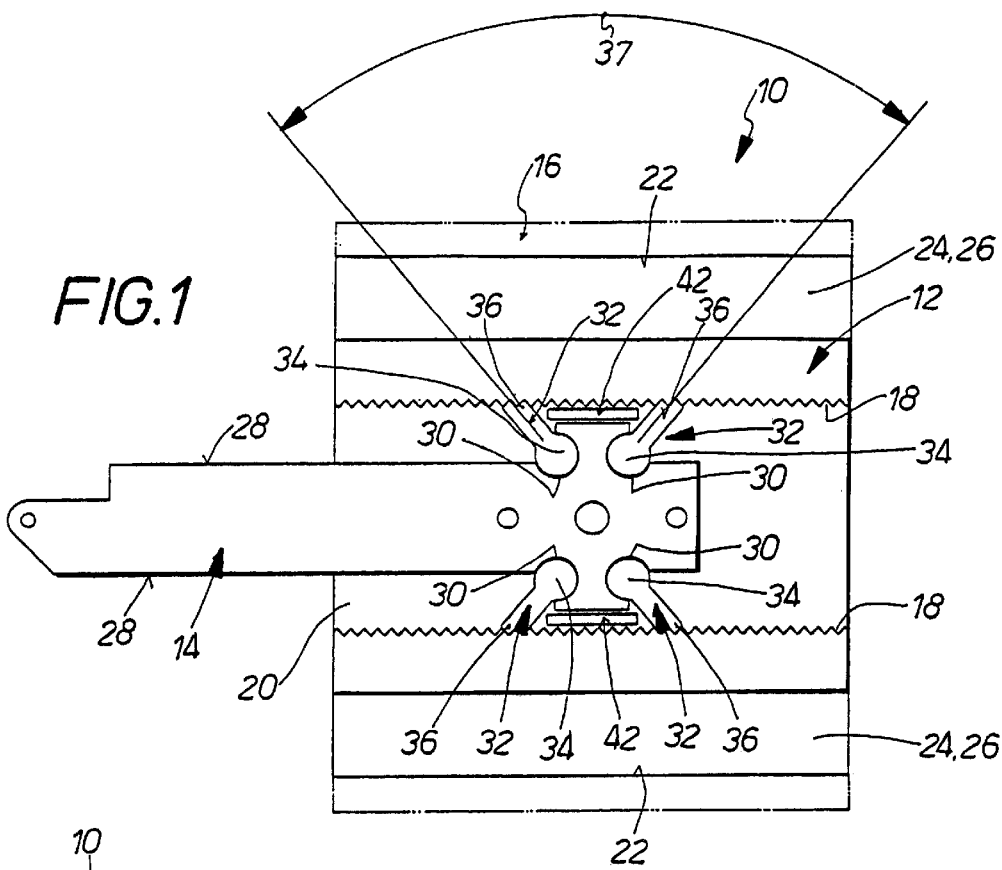
FIG. 1 is a diagrammatic plan view of essential parts of the displacement arrangement in a central position, without a cover plate member and thus also without the spring members forming integral components of the cover plate member.
Figure 2:
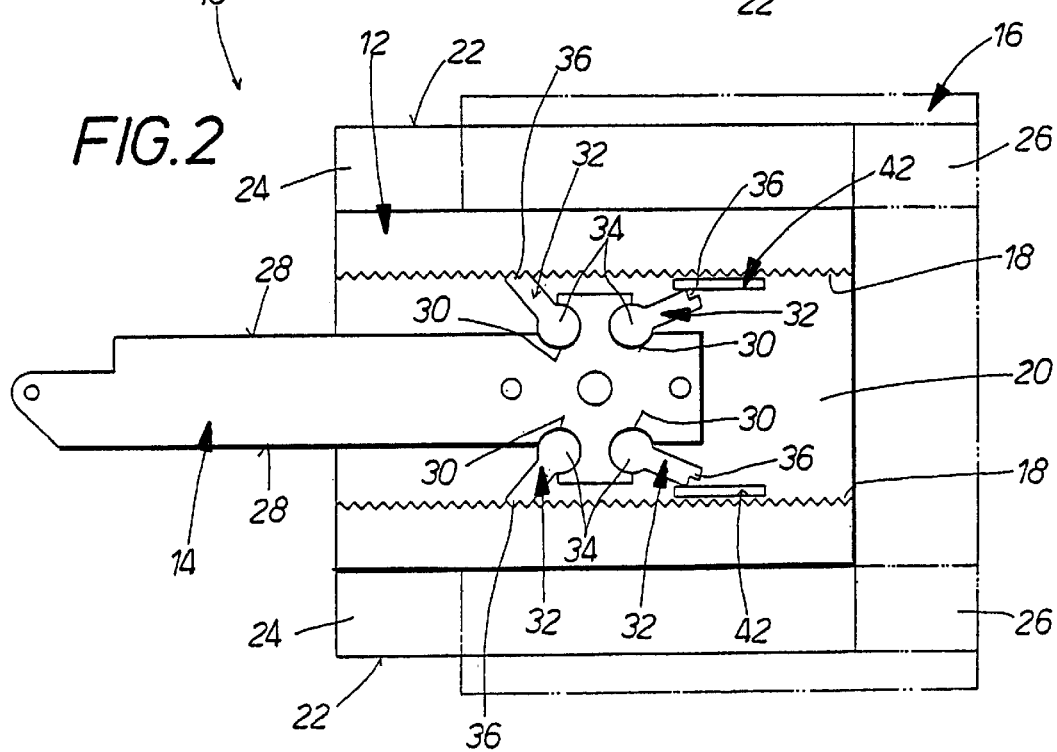
FIG. 2 is a view corresponding to FIG. 1 of the displacement arrangement shown therein in a position of being advanced in relation to the stationary base by a given displacement step.

Referring firstly to FIG. 1, shown therein as a plan view are essential parts of an embodiment of the displacement arrangement 10 according to the invention which is provided for linear, stepwise ratcheting displacement of a displacement member 12 by means of an elongate actuating member 14 relative to a stationary base 16. Such a displacement arrangement 10 can be used for example in relation to a vehicle seat for adjustment in respect of height or adjustment in respect of weight of the squab of the seat. In that situation the stationary base 16 is fixedly connected to the vehicle seat or a part thereof. The displacement member 12 is displaceable with a ratcheting stepwise movement in relation to the base 16. Mounted to the displacement member 12 is a spring member (not shown) which is displaced in relation to the base 16 in order to provide for optimum adjustment of the vehicle seat in relation to the weight of the respective occupant of the seat.

As will be apparent from FIG. 1, the displacement member 12 has first and second linear tooth means 18 which are disposed at a spacing from each other on respective sides of the direction of elongation of the actuating member 14 and which are oriented in mutually parallel relationship. The two linear tooth means 18 project upwardly from a bottom plate 20, as can be clearly seen from FIG. 5. The linear tooth means 18 are equally spaced from the two longitudinal edges 22 of the bottom plate 20, thus affording between the linear tooth means 18 and the longitudinal edges 22 guide ribs which are indicated at 24 and which can be clearly seen in FIG. 5 and which project into guide channels 26 in the stationary base 16 with a sliding fit tolerance, as can be seen in diagrammatic form in FIGS. 2 and 4.

The elongate actuating member 14 which for example is a generally plate-shaped or bar-shaped stamped sheet metal member is of a wall thickness which matches the heightwise dimension of the linear tooth means 18 of the displacement member 12 or is slightly smaller than same. At its two longitudinal edges as indicated at 28 the elongate actuating member 14 is provided with first and second recesses 30 which are spaced from each other in the axial direction of the actuating member 14 and which are of a part-round configuration. The partially round recesses 30 which are open to the respective longitudinal edge 28 serve for pivotably movably mounting respective ratchet members 32 therein. The ratchet members 32 are provided with part-round mounting portions 34, whereby they can be appropriately pivotably mounted in the recesses 30. The mounting portions 34 are thus matched to the recesses 30, with a sliding fit tolerance. The ratchet members 32 are of a wall thickness corresponding to the wall thickness of the elongate actuating member 14 and they each have a respective ratchet tooth means as indicated at 36. It will be noted that the ratchet tooth means 36 are matched in respect of shape to the linear tooth means 18 of the displacement member 12.

Figure 3:
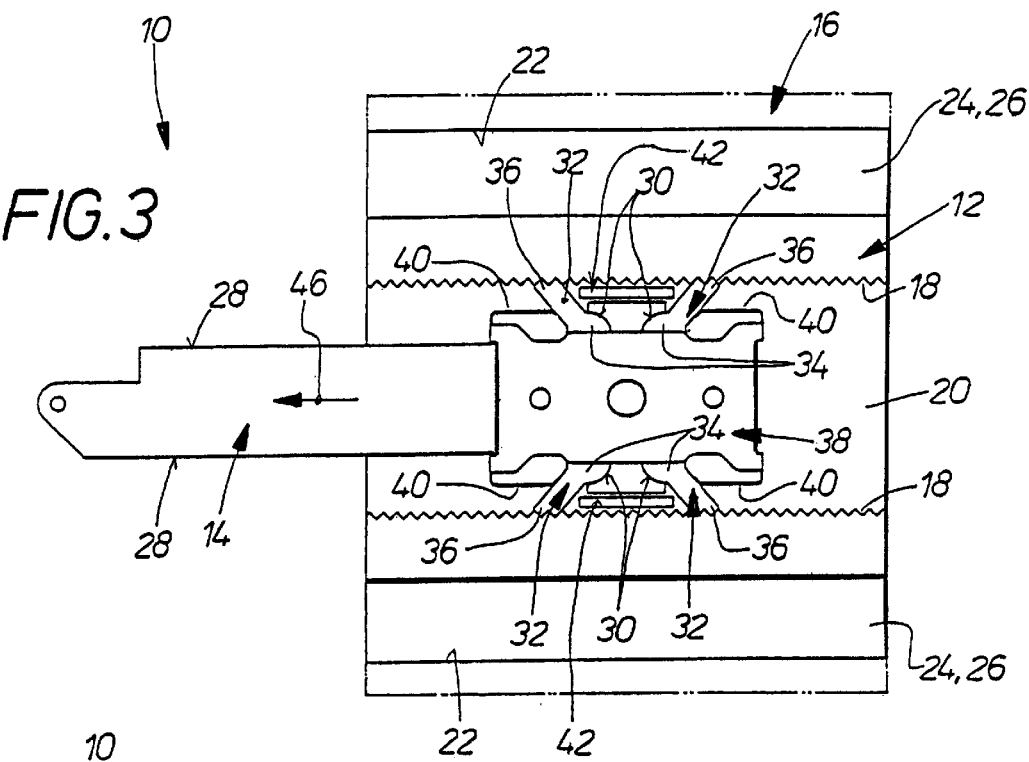
FIG. 3 is a view corresponding to FIG. 1, but also illustrating the cover plate member with the integral spring members thereon.

As can be seen from FIGS. 1 and 3, in a neutral central position of the displacement arrangement 10, the two ratchet members 32 associated with the respective linear tooth means 18 of the displacement member 12 include with each other a defined opening angle which is indicated in FIG. 1 by the arcuate double-headed arrow 37. The two ratchet members 32 mounted on the actuating member 14 at a respective longitudinal edge 28 thereof therefore are in mutually divergent relationship in a direction away from the actuating member 14.

Figure 4:
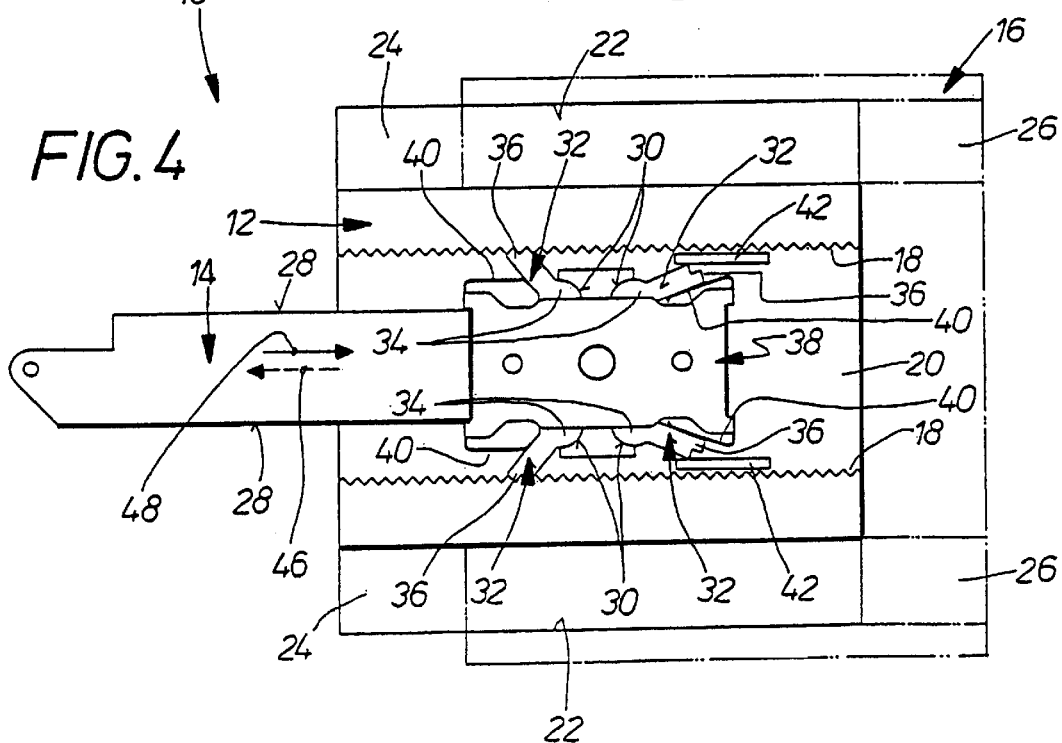
FIG. 4 shows the displacement arrangement of FIG. 3 in the position illustrated in FIG. 2 of being advanced by a given step.

Looking now at FIGS. 3, 4 and 5, secured to the elongate actuating member 14 is a cover plate member 38 comprising a portion of spring plate or sheet. Spring members 40 project away from the respective edges of the cover plate member 38, being formed in one piece therewith. In the condition of the cover plate member 38 of being fixed to the actuating member 14, the spring members 40 are urged resiliently against the ratchet members 32, as can be clearly seen from FIGS. 3 and 4. In the neutral position of the displacement arrangement 10 as shown in FIG. 3 therefore, the ratchet members 32 are urged by means of the spring members 40 against the linear tooth means 18 of the displacement member 12.

If the actuating member 14 is moved for example towards the left in FIG. 3 by a given stroke distance, as indicated by the arrow 46, then the displacement member 12 is entrained by the same distance in relation to the stationary base 16 by the actuating member 14, by way of the ratchet members 32 which are disposed on the left-hand side of the disengagement member 42 in FIG. 3, those ratchet members 32 being in engagement by way of their respective tooth means 36 with the linear tooth means 18 of the displacement member 12. At the same time the ratchet members 32 which are shown on the right-hand side in FIG. 3 are removed from the condition of engagement with the linear tooth means 18 of the displacement body 12, by the disengagement members 42 which are fixed with respect to the base. The last-mentioned ratchet members 32 are moved along the stationary disengagement members 42, as can be clearly seen from FIG. 4. It will be appreciated that the displacement distance 46 of the actuating member 14 is only of such a magnitude that the ratchet members 32 which are shown at the right-hand side in FIGS. 3 and 4 still remain on the disengagement members 42. The actuating member 14 is then moved back again by the same distance, as is indicated by the arrow 48 in FIG. 4. When that happens, the ratchet members 32 which are shown at the right-hand side in FIGS. 3 and 4 again move back on the stationary disengagement members 42. In that movement, the two ratchet members 32 shown at the left in FIGS. 3 and 4 perform a ratcheting pivotal movement about their mounting portions 34, as the tooth means 36 thereof move over the teeth of the linear tooth means 18. In that situation the displacement member 12 does not perform any movement as it is connected to the base 16 by virtue of frictional engagement therewith. The actuating member 14 is moved back again at most as far as the neutral position shown in FIG. 3. The actuating member 14 is then moved forwardly again by the displacement travel identified by the arrow 46, that is to say the advance movement step. This forward and backward movement, involving a pumping-like motion on the part of the actuating member 14, can be implemented repeatedly so that the displacement member 12 is displaced forwardly in a stepwise manner in relation to the base 16. In a corresponding manner, starting from the neutral position of the displacement member 12 and the actuating member 14 as shown in FIG. 3, the displacement member 12 can also be displaced with a stepwise movement towards the right and thus in the opposite direction to FIG. 4, in relation to the base 16.

It will be seen therefore that, by means of the elongate actuating member 14, the displacement member 12 is linearly displaceable stepwise in one direction or the other, as is indicated in FIG. 5 by the double-headed arrow 44.

The disengagement members 42 which are fixed on the stationary base 16 are provided between the respective linear tooth means 18 and the associated longitudinal edge 22, spaced therefrom, of the elongate actuating member 14, as can be clearly seen from FIGS. 1 through 4. The stationary base 16 therefore covers over for example the displacement member 12 at the top side, with the disengagement members 42 projecting downwardly and extending into the proximity of the linear tooth means 18.

It will be seen therefore that the disengagement member 42 for the respective ratchet members, between the linear tooth means 18 and the actuating member 14, being fixed with respect to the base 16, determines the respective linear displacement advance movement step in one direction of displacement or the other, opposite, direction of displacement. The frictional conditions between the displacement member 12 and the base 16 are such that the actuating member 14 entrains the displacement member with a stepwise movement in a ratcheting mode in the respective one direction of displacement or the other, but in the direction opposite to the one direction of displacement the displacement member 12 is secured to the base 16 by frictional engagement and it is only the actuating member 14 that is moved back in a ratcheting mode in relation to the displacement member 12 by the displacement advance movement step.

The displacement arrangement according to the invention permits linear displacement of the displacement member in relation to the stationary base in a first direction or in the other opposite direction, with a stepwise ratcheting movement, that is to say virtually in a pumping motion. That displacement in one direction or the other can be implemented rapidly, that is to say in such a way as to entail a relatively small amount of time. The overall structural height of the displacement arrangement according to the invention can be very small and both the structure thereof and assembly of the arrangement are relatively simple.

It will be appreciated that the above-described embodiment of the displacement arrangement according to the invention has been set forth solely by way of example and illustration of the principles of the invention and that various modifications and alterations may be made therein without thereby departing from the spirit and scope of the invention.

What is claimed is:

1. An arrangement for displacing a displacement member along a stationary base, comprising:

an elongate actuating member, at least one linear tooth means on the displacement member, first and second axially mutually spaced ratchet members pivotably mounted on the actuating member at at least one longitudinal edge thereof, the ratchet members including with each other an opening angle and having ratchet tooth means matching the linear tooth means, spring members urging the ratchet members towards the linear tooth means, and a disengagement member for the ratchet members, the disengagement member being disposed between the at least one linear tooth means and the actuating member, and said disengagement member being fixed with respect to the base and being operable to determine a respective linear displacement advance movement step in a respective first direction of displacement, wherein frictional conditions between the displacement member and the base are such that the actuating member is operable to entrain the displacement member stepwise in a ratcheting movement in said respective first direction of displacement, but in the direction opposite to said respective first direction the displacement member is secured to the base by frictional engagement and only said actuating member is moved back in ratcheting mode in relation to the displacement member by said displacement advance movement step.

2. The arrangement of claim 1 wherein at said at least one longitudinal edge thereof, the actuating member has first and second round recesses disposed at a spacing from each other in an elongate direction of the actuating member, and wherein each ratchet member has a round mounting portion which is pivotably movably mounted in a respective one of said recesses in the actuating member.

3. The arrangement of claim 1 wherein said arrangement has first and second spring members, said first and second spring members being carried by said actuating member at said at least one longitudinal edge thereof and applying spring force against the associated ratchet member.

4. The arrangement of claim 1 wherein the at least one linear tooth means, the actuating member and the ratchet members have thicknesses and dimensions which correspond to each other.

5. The arrangement of claim 1 wherein the spring members are in the form of leaf springs which have a thickness adapted to the ratchet members and the actuating member.

6. An arrangement as set forth in claim 1 and further including
 a cover plate member,
 means fixing the cover plate member to the actuating member, the cover plate member thereby holding the ratchet members to the actuating member,
 wherein the spring members are formed by integral portions of the cover plate member projecting therefrom.

7. The arrangement of claim 1 wherein the base has a central lengthwise portion, and wherein the at least one disengagement member is provided on said central lengthwise portion of the base.

8. The arrangement of claim 1 wherein the displacement member has first and second linear tooth means which are spaced from each other and are oriented in parallel relationship and between which the elongate actuating member is provided at equal spacings from each of the first and second linear guide means,
 wherein a respective pair of ratchet members is mounted pivotably to the actuating member at each of two longitudinal edges thereof, the ratchet tooth means of the ratchet members being urged towards the corresponding linear tooth means by respectively associated spring members,
 and further including, between each linear tooth means and the associated longitudinal edge of the actuating member, a respective disengagement member for the corresponding ratchet member.

9. An arrangement for displacement of a displacement member along a stationary base, comprising
 an elongate actuating member having at least a first longitudinal edge,
 means for producing reciprocating movement of the actuating member in its longitudinal direction,
 at least one linear tooth means on the displacement member,
 first and second ratchet members,
 mounting means for mounting the ratchet members pivotably on the actuating member at said longitudinal edge thereof at a spacing from each other in the longitudinal direction of the actuating member, the ratchet members being in mutually divergent relationship away from the actuating member,
 ratchet tooth means on each of the ratchet members and co-operable with the linear tooth means,
 spring means urging the respective ratchet members towards the linear tooth means,
 a disengagement member disposed between the linear tooth means and the actuating member, which in use of the arrangement is fixed with respect to said base and co-operable selectively with the respective ratchet members, for determining a linear stepwise advance displacement in a direction of displacement of the displacement member,
 the arrangement being such that between the displacement member and the base there are frictional conditions such that the actuating member entrains the displacement member stepwise in ratcheting mode in said direction of displacement, but in the direction opposite to said direction of displacement is fixed to the base by frictional engagement and only the actuating member is moved back in ratcheting mode in relation to the displacement member by the stepwise displacement.

* * * * *